United States Patent
Burbank

(10) Patent No.: US 11,787,333 B2
(45) Date of Patent: Oct. 17, 2023

(54) GARBAGE TRUCK CAMERA AND SAFETY SYSTEM

(71) Applicant: Daniel P. Burbank, Moultonborough, NH (US)

(72) Inventor: Daniel P. Burbank, Moultonborough, NH (US)

(*) Notice: Subject to any disclaimer, the term of this patent is extended or adjusted under 35 U.S.C. 154(b) by 67 days.

(21) Appl. No.: 17/692,712

(22) Filed: Mar. 11, 2022

(65) Prior Publication Data

US 2022/0289108 A1 Sep. 15, 2022

Related U.S. Application Data

(60) Provisional application No. 63/159,723, filed on Mar. 11, 2021.

(51) Int. Cl.

| | |
|---|---|
| *B60Q 9/00* | (2006.01) |
| *B60R 1/23* | (2022.01) |
| *B60R 1/29* | (2022.01) |
| *B65F 3/04* | (2006.01) |
| *B65F 3/14* | (2006.01) |
| *G06V 20/58* | (2022.01) |
| *B65F 3/02* | (2006.01) |
| *H04N 23/90* | (2023.01) |

(52) U.S. Cl.
CPC ............ *B60Q 9/00* (2013.01); *B60R 1/23* (2022.01); *B60R 1/29* (2022.01); *B65F 3/04* (2013.01); *B65F 3/14* (2013.01); *B65F 2003/0279* (2013.01); *G06V 20/58* (2022.01); *H04N 23/90* (2023.01)

(58) Field of Classification Search
CPC .... B60Q 9/00; B60R 1/29; B60R 1/23; B65F 3/04; B65F 3/14; B65F 2003/0279; G06V 20/58; H04N 23/90
See application file for complete search history.

(56) References Cited

U.S. PATENT DOCUMENTS

| | | | |
|---|---|---|---|
| 7,994,909 B2 | 8/2011 | Maruca et al. | |
| 8,630,773 B2 | 1/2014 | Lee et al. | |
| 9,420,203 B2 | 8/2016 | Broggi et al. | |
| 10,594,991 B1 | 3/2020 | Skolnick | |
| 2003/0031543 A1 | 2/2003 | Elbrink | |
| 2020/0034785 A1* | 1/2020 | Romano | B65F 3/14 |

* cited by examiner

*Primary Examiner* — Nicholas Kiswanto
*Assistant Examiner* — Jamal A Shah
(74) *Attorney, Agent, or Firm* — Boudwin Intellectual Property; Daniel Boudwin

(57) ABSTRACT

A garbage truck camera and safety system includes a garbage truck having a lift arm mechanism, a hopper, and a trash compacting device disposed within the hopper. At least one camera and temperature sensor are disposed within the hopper. A control module is operably connected to the cameras and the temperature sensor, as well as to one or more vehicle systems, via a vehicle control interface disposed within the driver's cab. The control module includes a processor, a non-transitory computer readable medium operatively connected to the processor, and a logic stored in the non-transitory computer readable medium that, when executed by the processor, causes the system to detect, via the temperature sensor, the temperature within the hopper; and if the temperature detected is above a predetermined threshold temperature, then deactivating the trash compacting device. The system will prevent harm from being done to individuals who accidentally fall into the hopper.

17 Claims, 3 Drawing Sheets

GARBAGE TRUCK CAMERA AND SAFETY SYSTEM

CROSS-REFERENCE TO RELATED APPLICATIONS

This application claims the benefit of U.S. Provisional Application No. 63/159,723 filed on Mar. 11, 2021. The above identified patent application is herein incorporated by reference in its entirety to provide continuity of disclosure.

BACKGROUND OF THE INVENTION

The present invention relates to a camera and safety system for a garbage truck. More specifically, the present invention includes a camera and safety system that is configured to detect the presence of human beings within the garbage truck hopper, alert the driver, and automatically deactivate various systems in order to prevent injury or death of the person in the hopper. A thermal imaging system for a front load trash truck will increase overall safety by immediately notifying the truck operator of the present of an individual in the truck hopper. The present invention can also be adapted for use in other commercial vehicles, such as mail and package delivery trucks, for example.

Some garbage trucks include front loading lifting arms that pick up large dumpers, upend them, and dump them into the truck hopper, where the garbage is then compacted. Unfortunately, it is not uncommon for people to be accidentally injured or killed by falling into garbage truck hoppers. For example, individuals seeking temporary warmth and shelter in a garbage bin or dumpster can be mistakenly lifted and dumped into the hopper of the trash truck. The operator of the garbage truck is positioned within the driver's cabin. While there are sometimes mirrors and cameras for the driver to see the contents of the hopper, they can be easily obscured by excess trash, ice buildup, dirt, and other debris, limiting the driver's ability to observe someone falling into the hopper. Further, the noise of the dumping and compacting device prevents the operator from being able to hear if someone is in the hopper. This unfortunately leads to accidents occurring, where individuals are trapped within the hopper without it being known to the operator.

The main purpose of the present invention is to save lives and property. A camera system and safety system with thermal imaging capabilities as well as audio and video capabilities will help reduce the number of accidents. It will also potentially prevent the loss of trucks that are involved in such accidents. In view of the above concerns, it is desirable to provide a garbage truck camera safety system that provides audible and visual alerts for drivers that will notify drivers of individuals in harm's way. The system will automatically notify the truck's operator and stop the truck's compacting systems when a person is detected within the hopper, in order to prevent injury to the individual and damage to the truck.

Some camera systems for trash trucks exist in the known art. However, these have several drawbacks. For example, the cameras in the known art include only visual capabilities and are currently only utilized to monitor for improper trash items. The current cameras provide the operator with a view into the cabin, however a driver may not be able to witness a person falling into the hopper in real time due to distractions from other tasks. Further, as discussed above, the noise and possibility of debris and other material obscuring the cameras lessens their effectiveness. Therefore, an improvement needs to be made to the current camera systems to increase overall safety by alerting the driver through additional means, as well as by being able to automatically stop the compacting without driver intervention.

In light of the devices disclosed in the known art, it is submitted that the present invention substantially diverges in design elements from the known art and consequently it is clear that there is a need in the art for an improvement to existing camera systems and safety systems for garbage trucks and other similar commercial vehicles. In this regard the present invention substantially fulfills these needs.

SUMMARY OF THE INVENTION

The present invention provides a garbage truck camera and safety system, which can be utilized to increase overall safety by notifying operators of individuals being in the hopper, as well as by automatically stopping the truck's systems when the individual is detected by the present system. In general, the garbage truck camera and safety system includes a garbage truck having a lift arm mechanism, a hopper, and a trash compacting device disposed within the hopper. At least one camera is disposed within the hopper, which is designed to provide full coverage of the area within the hopper. At least one temperature sensor is also disposed within the hopper, which may be separate from the camera, or included in the case of using an infrared camera.

The system further includes a control module operably connected to the cameras and the temperature sensor. The control module is also operably connected to one or more vehicle systems via a vehicle control interface, which is housed within a display and control mechanism situated within the operator's cabin. The control module includes a processor, a non-transitory computer readable medium operatively connected to the processor, and a logic stored in the non-transitory computer readable medium that, when executed by the processor, causes the system to perform a method. The method includes detecting, via the temperature sensor, the temperature within the hopper. If the temperature detected is above a predetermined threshold temperature, then the control module communicates with the vehicle systems to automatically deactivate the trash compacting device, which will prevent harm from being done to the individual within the hopper and to prevent damage from being done to the vehicle. The control module can also control other systems, such as an audible alarm and visual display, which will further alert the driver to the presence of an individual within the hopper.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
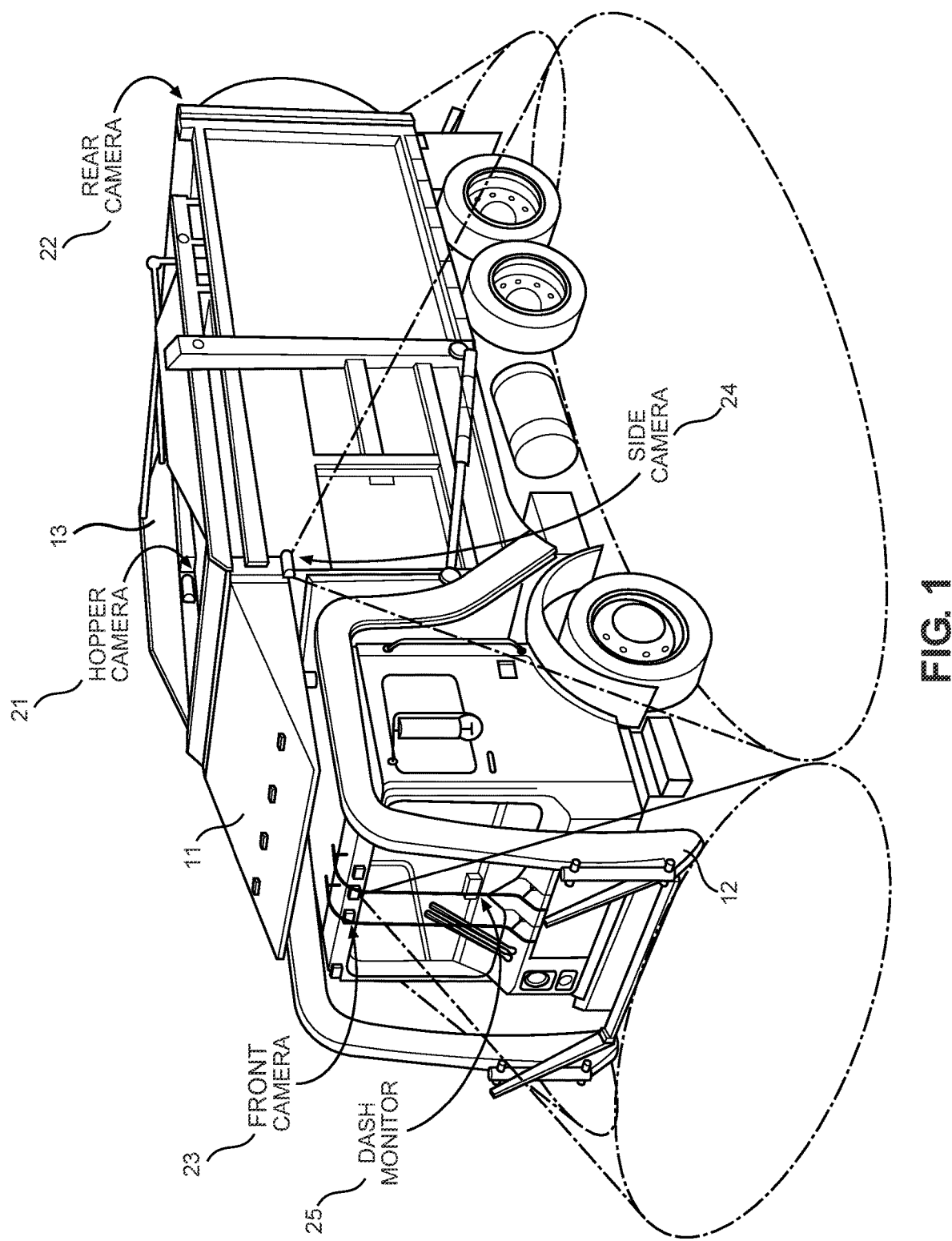
FIG. 1 shows a perspective view of an embodiment of the garbage truck camera and safety system.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a microcontroller", "a sensor", "a camera", "a computer-readable medium," "a processor," "a memory", "a logic", and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure. As used herein, the term "processor" can refer to any electronic circuit which performs operations on some external source. As used herein, the term "logic" can include any combination of computer software instructions, integrated circuit-based logic gates, switch or junction-based logic gates, etc. As used herein, the term "memory" can refer to any non-transitory computer readable medium, including but not limited to simple circuit states via logic gates or switch positions, as well as solid state computer readable storage.

According to some embodiments, the operations, techniques, and/or components described herein can be implemented by an electronic device, which can include any combination of digital and analogue circuitry, as well as one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

Reference is made herein to the attached drawings. Like reference numerals are used throughout the drawings to depict like or similar elements of the garbage truck camera and safety system. For the purposes of presenting a brief and clear description of the present invention, a preferred embodiment will be discussed as used for a front-loading garbage truck, specifically to detect individuals who are accidentally dumped into the hopper of the garbage truck. However, other embodiments are contemplated, including different types of garbage trucks, as well as any other suitable commercial or larger vehicle, in which such safety systems would be desirable.

Referring now to FIG. 1 there is shown a perspective view of an embodiment of the garbage truck camera and safety system. The system generally includes a garbage truck 11 having a lift arm mechanism 12, a hopper, and a trash compacting device disposed within the hopper, which is visible in FIG. 2. While a front-loading lift arm mechanism 12 is shown, the present system can be utilized with any type of garbage truck that includes a compacting element, and further with any possible commercial vehicle. In the shown embodiment, at least one camera 21 is disposed within the hopper 13. The system further includes exterior cameras for additional monitoring and safety. In the shown embodiment, the exterior cameras include a rear camera 22 mounted to a rear end of the garbage truck 11, a front camera 23 mounted to a front end of the garbage truck, and a pair of side cameras 24, each side camera mounted to a side of the garbage truck.

All of the cameras are configured to record and display video via a vehicle control interface, which includes a dash monitor 25 disposed within the vehicle cabin. The cameras are numbered and positioned such that a full 360 degree view of the surroundings of the garbage truck can be monitored by the operator. The cameras may be positioned in such away that is advantageous to keeping them operating as intended. For example, the front camera 23 can be positioned under the upper cabin shroud, to prevent debris and trash from accidentally contacting and damaging the front camera 23. The remaining cameras can include similar advantageous positioning that uses elements of the truck to shield the cameras. In other embodiments, the cameras include additional shielding elements attached to their housings.

Figure 2:
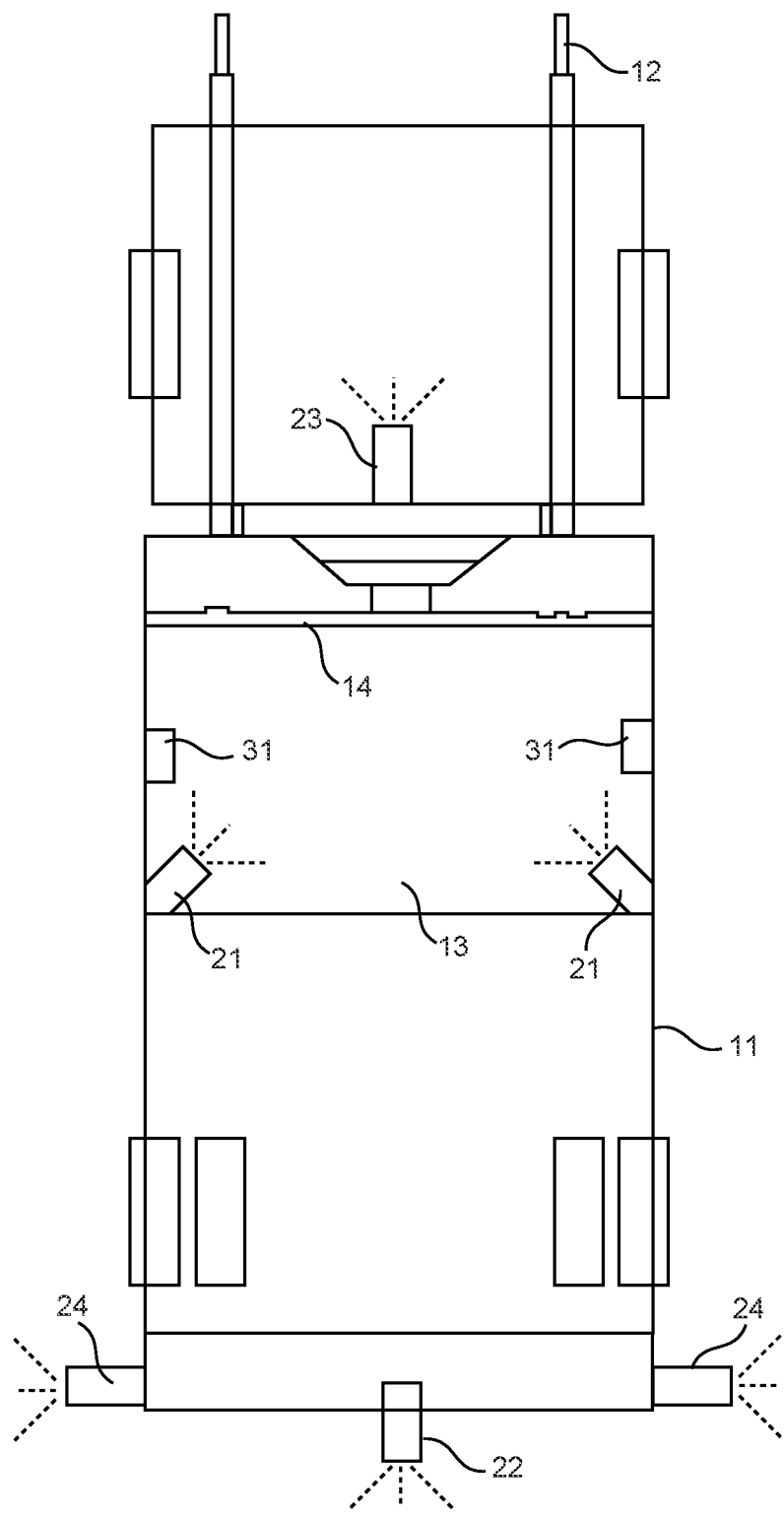
FIG. 2 shows a top plan view of an embodiment of the garbage truck camera and safety system.

Referring now to FIG. 2, there is shown a top plan view of an embodiment of the garbage truck camera and safety system. The hopper cameras 21 are positioned such that they will not be contacted by the compacting element 14 as trash is compacted. Further, the hopper cameras 21 are adapted to provide a view of the entire interior area of the hopper 13. The system further includes temperature sensors 31 disposed within the hopper, which are configured to detect the temperature of items falling into the hopper 13 as the lift arms 12 dump a container into the hopper 13. In some embodiments, the temperature sensors 31 are independent sensors, while in other embodiments, the temperature sensors 31 are embedded within the hopper cameras 21, in that the hopper cameras 21 may be infrared cameras. The front 23, rear 22, and side 24 cameras are shown in one position, but may occupy any desired position on the body of the truck.

The hopper cameras 21 and any separate temperature sensor modules 31 ideally will be located somewhere beneath the cab protector portion of the vehicle. In this way, the camera is protected from damage as debris is dumped into the hopper. Preferably, the front camera 23 is positioned inside of the cab on the windshield. Additional shrouds and guards may be included to protect the cameras from snow, ice, and other cold weather hazards. In the shown embodiment, the hopper includes at two cameras adapted to provide a total image of the interior of the hopper for the operator via the display screen of the vehicle control interface.

Figure 3:
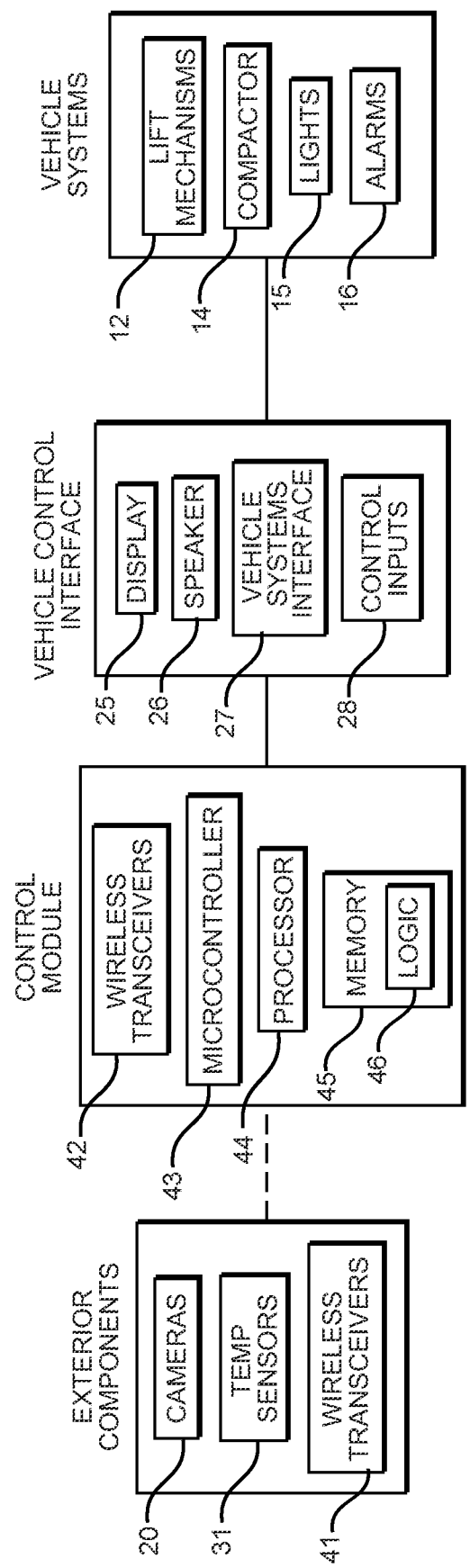
FIG. 3 shows a diagram of the components of an embodiment of the garbage truck camera and safety system.

Referring now to FIG. 3, there is shown a diagram of the components of an embodiment of the garbage truck camera and safety system. The exterior system components include all of the cameras 20, which includes the exterior cameras and hopper cameras, as well as any independent temperature sensors 31. Each camera 20 and sensor 31 includes an independent power supply in some embodiments, but may be hard wired to a single power supply in other embodiments, which may be the vehicle battery or a separate onboard power supply for the system. Further, each camera 20 and sensor 31 may include a wireless transceiver 41 for communicating wirelessly with a control module's wireless transceiver 42 via a network such as a LAN, WLAN, Bluetooth connection, WiFi connection, or any other suitable wireless communications protocols. Some embodiments may instead include all hard-wired connections between components of the system.

The control module is operably connected to the cameras 20 and the temperature sensors 31 via wired or wireless connections. Similarly, the control module is also operably connected to one or more vehicle systems via a vehicle control interface. The vehicle control interface is preferably a single control unit that is disposed within the cabin of the vehicle. The vehicle control interface includes a display screen 25 that displays status alerts, images from the exterior and hopper cameras 20, and other information. The vehicle control interface can further includes a speaker 26 for emitting audible alarms, as well as input controls 28 such as buttons, touchscreens, keypads, or the like for controlling the system's operation. In some embodiments, the main control module is integrated within the housing of the vehicle control interface.

The control module further includes a processor 44, a non-transitory computer readable medium operatively connected to the processor, which may be a flash memory, hard disc, or any other suitable memory type, and a logic 46 stored in the non-transitory computer readable medium that, when executed by the processor 44, causes the system to perform a method. The method includes detecting, via the temperature sensors 31, a temperature within the hopper. If the temperature detected is above a predetermined threshold temperature, such that there is a likelihood a person is currently in the hopper, then the system automatically deactivates the trash compacting device 14. This will prevent injury from occurring to the individual in the hopper, and further prevent damage from occurring to the truck itself.

Other vehicle systems may be automatically controlled in order to increase the safety provided by the present system. For example, the garbage truck camera and safety system further includes an in-vehicle alarm, such that they system activates the in-vehicle alarm, emitting a sound through the vehicle control interface speaker 26 if the temperature detected is above the predetermined threshold temperature. The system can further be configured to operate the vehicle's own alarm 16, horn, or other sounding devices, in order to alert the operator and surrounding individuals of the detected danger. In other embodiments, the further deactivates the lift arm mechanism 12 if the temperature detected is above a predetermined threshold temperature. Likewise, the system can further be configured to activate one or more vehicle lights if the temperature detected is above a predetermined threshold temperature. These additional alert methods ensure that the vehicle operator is notified when an individual accidentally falls within the hopper or otherwise becomes dangerously close to the exterior of the vehicle.

In some embodiments, the control module further comprises an image recognition module, wherein the image recognition module is configured to scan recorded images from the exterior and hopper cameras, and automatically detect the presence of an individual within the hopper or within the viewing area of the exterior cameras. This can further enhance the safety of the present system, by providing an additional mechanism for detecting when individuals are too close to the vehicle or if they are accidentally in the hopper area. In this way, the present invention greatly enhances the safety of current garbage trucks and other commercial vehicles, which will prevent individuals from being injured by the garbage trucks and prevent the garbage trucks themselves from becoming damaged.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention.

Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A garbage truck camera and safety system, comprising: a garbage truck having a lift arm mechanism, a hopper, and a trash compacting device disposed within the hopper; a camera disposed within the hopper; a temperature sensor disposed within the hopper; and a control module operably connected to the camera and the temperature sensor, the control module operably connected to one or more vehicle systems via a vehicle control interface;
wherein the control module detects via the temperature sensor, the temperature within the hopper, if the temperature detected is above a predetermined threshold temperature, then deactivating the trash compacting device.

2. The garbage truck camera and safety system of claim 1, wherein the one or more vehicle systems further includes an in-vehicle alarm.

3. The garbage truck camera and safety system of claim 1, further comprising a plurality of exterior cameras operably connected to the control module and the vehicle control interface, wherein the plurality of exterior cameras includes a rear camera mounted to a rear end of the garbage truck, a front camera mounted to a front end of the garbage truck, and a pair of side cameras, each side camera mounted to a side of the garbage truck.

4. The garbage truck camera and safety system of claim 3, wherein the vehicle control interface includes a display screen disposed within the vehicle cabin that is configured to display images from the camera disposed within the hopper, as well the exterior cameras.

5. The garbage truck camera and safety system of claim 3, wherein the hopper camera and the exterior cameras are in wireless communication with the control module.

6. The garbage truck camera and safety system of claim 1, wherein the camera in the hopper comprises at least two cameras adapted to provide a total image of an interior of the hopper for an operator via the display screen of the vehicle control interface.

7. The garbage truck camera and safety system of claim 1, wherein the control module further comprises an image recognition module, wherein the image recognition module scans recorded images from the hopper camera and is adapted to automatically detect a presence of a person within the hopper.

8. The garbage truck camera and safety system of claim 7, wherein the image recognition module scans recorded images from the exterior camera and is adapted to automatically detect the presence of the person within a viewing field of the exterior cameras.

9. The garbage truck camera and safety system of claim 1, wherein the control module is integrated within a housing of the vehicle control interface.

10. A method for utilizing a garbage truck camera and safety system, comprising the steps of: detecting a temperature within a hopper; determining if the temperature within the hopper is above a predetermined threshold temperature; and deactivating the garbage truck camera and safety system if the temperature within the hopper is above the predetermined threshold temperature.

11. The method according to claim 10, wherein the detecting step includes the temperature is detected within the hopper via a sensor of the garbage truck camera and safety system.

12. The method according to claim 10, wherein the determining step includes if the temperature within the hopper is above the predetermined threshold temperature, then there is a likelihood that a person is currently in the hopper.

13. The method according to claim 12, wherein the deactivating step includes preventing injury from occurring to the person within the hopper and further preventing damage from occurring to a garbage truck itself.

14. A non-transitory computer storage media having instructions stored thereon which, when executed, execute a method comprising the steps of: detecting a temperature within a hopper; determining if the temperature within the hopper is above a predetermined threshold temperature; and deactivating the garbage truck camera and safety system if the temperature within the hopper is above the predetermined threshold temperature.

15. The non-transitory computer storage media according to claim 14, wherein the detecting step includes the temperature is detected within the hopper via a sensor of the garbage truck camera and safety system.

16. The non-transitory computer storage media according to claim 14, wherein the determining step includes if the temperature within the hopper is above the predetermined threshold temperature, then there is a likelihood that a person is currently in the hopper.

17. The non-transitory computer storage media according to claim 16, wherein the deactivating step includes preventing injury from occurring to the person within the hopper and further preventing damage from occurring to a garbage truck itself.

* * * * *